(12) United States Patent
Ederer

(10) Patent No.: US 10,226,919 B2
(45) Date of Patent: Mar. 12, 2019

(54) ARTICLES AND STRUCTURES PREPARED BY THREE-DIMENSIONAL PRINTING METHOD

(71) Applicant: Voxeljet AG, Friedberg (DE)

(72) Inventor: Ingo Ederer, Geltendorf (DE)

(73) Assignee: VOXELJET AG, Friedberg (DE)

( * ) Notice: Subject to any disclaimer, the term of this patent is extended or adjusted under 35 U.S.C. 154(b) by 0 days.

(21) Appl. No.: 15/345,589

(22) Filed: Nov. 8, 2016

(65) Prior Publication Data

US 2017/0050387 A1 Feb. 23, 2017

Related U.S. Application Data

(62) Division of application No. 12/669,063, filed as application No. PCT/DE2008/001073 on Jul. 1, 2008, now Pat. No. 9,505,176.

(30) Foreign Application Priority Data

Jul. 18, 2007 (DE) .......................... 10 2007 033 434

(51) Int. Cl.
| | |
|---|---|
| *B33Y 80/00* | (2015.01) |
| *B29C 64/40* | (2017.01) |
| *B29C 64/153* | (2017.01) |
| *B29C 64/165* | (2017.01) |

(52) U.S. Cl.
CPC .............. *B33Y 80/00* (2014.12); *B29C 64/40* (2017.08); *B29C 64/153* (2017.08); *B29C 64/165* (2017.08)

(58) Field of Classification Search
CPC ................................ B33Y 80/00; B33Y 10/00

USPC ........................................................ 358/1.9
See application file for complete search history.

(56) References Cited

U.S. PATENT DOCUMENTS

| | | |
|---|---|---|
| 3,913,503 A | 10/1975 | Becker |
| 4,247,508 A | 1/1981 | Housholder |
| 4,369,025 A | 1/1983 | Von Der Weid |
| 4,575,330 A | 3/1986 | Hull |
| 4,591,402 A | 5/1986 | Evans et al. |
| 4,600,733 A | 7/1986 | Ohashi et al. |
| 4,665,492 A | 5/1987 | Masters |

(Continued)

FOREIGN PATENT DOCUMENTS

| | | |
|---|---|---|
| AU | 720255 B2 | 5/2000 |
| CN | 101146666 A | 3/2008 |

(Continued)

OTHER PUBLICATIONS

US 4,937,420, 06/1990, Deckard (withdrawn)

(Continued)

*Primary Examiner* — Christina A Johnson
*Assistant Examiner* — Xue H Liu
(74) *Attorney, Agent, or Firm* — The Dobrusin Law Firm, P.C.

(57) ABSTRACT

The present invention relates to articles prepared using a three-dimensional printing method, an auxiliary structure being additionally formed beyond an extension of the one or more components during the construction of components. The invention also relates to an auxiliary structure for components produced by means of three-dimensional printing methods, the auxiliary structure being constructed along with the component and extending beyond a dimension of the one or more components.

23 Claims, 4 Drawing Sheets

(56) References Cited

U.S. PATENT DOCUMENTS

| | | |
|---|---|---|
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 9/1993 | Evans, Jr. et al. |
| 5,252,264 A | 10/1993 | Forderhase et al. |
| 5,263,130 A | 11/1993 | Pomerantz et al. |
| 5,263,310 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A * | 4/1996 | Crump .............. B33Y 10/00 264/308 |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,055 A | 11/1996 | Melling et al. |
| 5,573,721 A | 11/1996 | Gillette |
| 5,589,222 A | 12/1996 | Thometzek et al. |
| 5,597,589 A | 1/1997 | Deckard |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,807,437 A | 9/1998 | Sachs et al. |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A | 12/1999 | Danforth |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,116,517 A | 9/2000 | Heinzl et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 11/2001 | Elvidge et al. |
| 6,318,418 B1 | 11/2001 | Grossmann et al. |
| 6,322,728 B1 | 11/2001 | Brodkin et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,436,334 B1 | 8/2002 | Hattori et al. |
| 6,460,979 B1 | 10/2002 | Heinzl et al. |
| 6,467,525 B2 | 10/2002 | Herreid et al. |
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,827,988 B2 | 12/2004 | Krause et al. |
| 6,830,643 B1 | 12/2004 | Hayes |
| 6,838,035 B1 | 1/2005 | Ederer et al. |
| 6,855,205 B2 | 2/2005 | McQuate et al. |
| 6,896,839 B2 | 5/2005 | Kubo et al. |
| 6,972,115 B1 | 12/2005 | Ballard |
| 6,989,115 B2 | 1/2006 | Russell et al. |
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer |

(56) References Cited

U.S. PATENT DOCUMENTS

| | | | |
|---|---|---|---|
| 7,220,380 B2 | 5/2007 | Farr et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer |
| 7,722,802 B2 | 5/2010 | Pfeiffer et al. |
| 7,807,077 B2 | 5/2010 | Ederer et al. |
| 7,736,578 B2 | 6/2010 | Ederer |
| 7,748,971 B2 | 7/2010 | Hochsmann |
| 7,767,130 B2 | 8/2010 | Elsner |
| 7,795,349 B2 | 9/2010 | Bredt et al. |
| 7,799,253 B2 | 9/2010 | Höschmann et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0112523 A1 | 6/2004 | Crom |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0093194 A1 | 5/2005 | Oriakhi et al. |
| 2005/0167872 A1 | 8/2005 | Ederer et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0219942 A1 | 10/2005 | Wallgren |
| 2005/0280185 A1 | 12/2005 | Russell et al. |
| 2005/0283136 A1 | 12/2005 | Skarda |
| 2006/0013659 A1 | 1/2006 | Pfeiffer et al. |
| 2006/0105102 A1 | 5/2006 | Hochsmann et al. |
| 2006/0108090 A1 | 5/2006 | Ederer et al. |
| 2006/0159896 A1 | 7/2006 | Pfeifer et al. |
| 2006/0175346 A1 | 8/2006 | Ederer et al. |
| 2006/0176346 A1 | 8/2006 | Ederer et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0054143 A1 | 3/2007 | Otoshi |
| 2007/0057412 A1 | 3/2007 | Weiskopf et al. |
| 2007/0065397 A1 | 3/2007 | Ito et al. |
| 2007/0126157 A1* | 6/2007 | Bredt .................. B33Y 40/00 264/334 |
| 2007/0215020 A1 | 9/2007 | Miller |
| 2007/0238056 A1 | 10/2007 | Baumann et al. |
| 2008/0001331 A1 | 1/2008 | Ederer |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner |
| 2008/0237933 A1 | 10/2008 | Hochsmann et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0011066 A1 | 1/2009 | Davidson et al. |
| 2009/0068376 A1 | 3/2009 | Philippi et al. |
| 2009/0261497 A1 | 10/2009 | Ederer et al. |
| 2010/0007062 A1 | 1/2010 | Larsson et al. |
| 2010/0026743 A1 | 2/2010 | Van Thillo et al. |
| 2010/0152865 A1 | 6/2010 | Jonsson et al. |
| 2010/0212584 A1 | 8/2010 | Ederer et al. |
| 2010/0207288 A1 | 9/2010 | Enrico |
| 2010/0243123 A1 | 9/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Hartmann |
| 2012/0113439 A1 | 5/2012 | Ederer |
| 2012/0126457 A1 | 5/2012 | Abe et al. |

(56) References Cited

U.S. PATENT DOCUMENTS

| | | |
|---|---|---|
| 2012/0189102 A1 | 7/2012 | Maurer, Jr. et al. |
| 2012/0291701 A1 | 11/2012 | Grasegger et al. |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0202381 A1 | 7/2014 | Ederer et al. |
| 2014/0202382 A1 | 7/2014 | Ederer |
| 2014/0212677 A1 | 7/2014 | Gnuchtel et al. |
| 2014/0227123 A1 | 8/2014 | Gunster |
| 2014/0236339 A1 | 8/2014 | Fagan |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0321423 A1 | 11/2015 | Gunther |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0257073 A1 | 3/2016 | Mogele et al. |
| 2016/0107386 A1 | 4/2016 | Hartmann et al. |
| 2016/0114533 A1 | 4/2016 | Grasegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2016/0318251 A1 | 11/2016 | Ederer et al. |
| 2017/0028630 A1 | 2/2017 | Ederer et al. |
| 2017/0050378 A1 | 2/2017 | Ederer |
| 2017/0106595 A1 | 4/2017 | Gunther et al. |
| 2017/0136524 A1 | 5/2017 | Ederer et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0197367 A1 | 7/2017 | Ederer et al. |
| 2017/0210037 A1 | 7/2017 | Ederer et al. |
| 2017/0217098 A1 | 8/2017 | Hartmann et al. |
| 2017/0305139 A1 | 10/2017 | Hartmann |
| 2017/0326693 A1 | 11/2017 | Ederer et al. |
| 2017/0355137 A1 | 12/2017 | Ederer et al. |
| 2018/0079133 A1 | 3/2018 | Ederer et al. |
| 2018/0141271 A1 | 5/2018 | Gunther et al. |
| 2018/0141272 A1 | 5/2018 | Hartmann et al. |
| 2018/0169758 A1 | 6/2018 | Ederer et al. |
| 2018/0222082 A1 | 8/2018 | Gunther et al. |
| 2018/0222174 A1 | 8/2018 | Gunther et al. |

FOREIGN PATENT DOCUMENTS

| | | |
|---|---|---|
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 4300478 | 8/1994 |
| DE | 29506204 U1 | 6/1995 |
| DE | 4400523 | 7/1995 |
| DE | 4440397 | 9/1995 |
| DE | 19511772 A1 | 10/1996 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19723892 C1 | 9/1998 |
| DE | 19846478 C2 | 4/2000 |
| DE | 19853834 | 5/2000 |
| DE | 10047614 | 4/2002 |
| DE | 69634921 T2 | 12/2005 |
| DE | 201 22 639 U1 | 11/2006 |
| DE | 10 2006 040 305 A1 | 3/2007 |
| DE | 102006029298 A1 | 12/2007 |
| DE | 102007040755 A1 | 3/2009 |
| DE | 102007047326 A1 | 4/2009 |
| DE | 102010015451 A1 | 10/2011 |
| DE | 102011053205 A1 | 3/2013 |
| DE | 102015006363 A1 | 12/2016 |
| DE | 102015008860 A1 | 1/2017 |
| DE | 102015011503 A1 | 3/2017 |
| DE | 102015011790 A1 | 3/2017 |
| EP | 0361847 B1 | 4/1990 |
| EP | 0431924 B1 | 6/1991 |
| EP | 0688262 | 12/1995 |
| EP | 0711213 | 5/1996 |
| EP | 0734842 | 10/1996 |
| EP | 0739666 | 10/1996 |
| EP | 0968776 | 1/2000 |
| EP | 1163999 | 12/2001 |
| EP | 1415792 | 5/2004 |
| EP | 1442870 | 8/2004 |
| EP | 1486318 A | 12/2004 |
| EP | 1381504 B1 | 8/2007 |
| FR | 2790418 | 9/2000 |
| GB | 2297516 A | 8/1996 |
| GB | 2382798 | 6/2003 |
| JP | S62275734 A | 11/1987 |
| JP | 2003-136605 A | 5/2003 |
| JP | 2004082206 A | 3/2004 |
| JP | 2009202451 A | 9/2009 |
| WO | 95/18715 A1 | 7/1995 |
| WO | 96/05038 A1 | 2/1996 |
| WO | 00/21736 A1 | 4/2000 |
| WO | 00/51809 A1 | 9/2000 |
| WO | 01/26885 A1 | 4/2001 |
| WO | 01/72502 A1 | 4/2001 |
| WO | 01/34371 A2 | 5/2001 |
| WO | 01/40866 A2 | 6/2001 |
| WO | 2001/078969 A2 | 10/2001 |
| WO | 02/26419 A1 | 4/2002 |
| WO | 02/26420 A1 | 4/2002 |
| WO | 02/26478 A1 | 4/2002 |
| WO | 02/064353 A1 | 8/2002 |
| WO | 02/064354 A1 | 8/2002 |
| WO | 03/016030 A1 | 2/2003 |
| WO | 03/016067 A2 | 2/2003 |
| WO | 03/103932 A1 | 12/2003 |
| WO | 2004/010907 A1 | 2/2004 |
| WO | 2004/014637 A1 | 2/2004 |
| WO | 2004/110719 A2 | 12/2004 |
| WO | 2004/112988 A2 | 12/2004 |
| WO | 2005/113219 A1 | 12/2005 |
| WO | 2006/100166 A1 | 9/2006 |
| WO | 2008/049384 A1 | 5/2008 |
| WO | 2008061520 A2 | 5/2008 |
| WO | 2011063786 A1 | 6/2011 |
| WO | 2013075696 A1 | 5/2013 |
| WO | 2014090207 A1 | 6/2014 |
| WO | 2014166469 A1 | 10/2014 |
| WO | 2015078430 A1 | 6/2015 |
| WO | 2015081926 A1 | 6/2015 |
| WO | 2015085983 A2 | 6/2015 |
| WO | 2015090265 A1 | 6/2015 |
| WO | 2015090567 A1 | 6/2015 |
| WO | 2015096826 A1 | 7/2015 |
| WO | 2015149742 A1 | 10/2015 |
| WO | 2015180703 A1 | 12/2015 |

(56) References Cited

FOREIGN PATENT DOCUMENTS

| WO | 2016019937 A1 | 2/2016 |
| WO | 2016019942 A1 | 2/2016 |
| WO | 2016058577 A1 | 4/2016 |
| WO | 2016095888 A1 | 6/2016 |
| WO | 2016101942 A1 | 6/2016 |

OTHER PUBLICATIONS

Cima et al., "Computer-derived Microstructures by 3D Printing: Bio- and Structural Materials," SFF Symposium, Austin, TX, 1994.
EOS Operating Manual for Laser Sintering Machine with Brief Summary.
Sachs et al., "Three-Dimensional Printing: Rapid Tooling and Prototypes Directly from a CAD Model", Massachusetts Institute of Technology, pp. 131-136.
Sachs et al., "Three-Dimensional Printing: Rapid Tooling and Prototypes Directly from a CAD Model", Massachusetts Institute of Technology, pp. 143-151.
Jacobs et al., 2005 SME Technical Paper, title "Are QuickCast Patterns Suitable for Limited Production?".
Feature Article—Rapid Tooling—Cast Resin and Sprayed Metal Tooling by Joel Segal.
Williams, "Feasibility Study of Investment Casting Pattern Design by Means of Three Dimensional Printing", Department of Machanical Engineering, pp. 2-15.
International Search Report, WO 04/110719, dated Jan. 11, 2005.
Gephart, Rapid Prototyping, pp. 118-119.
Marcus et al., Solid Freedom Fabrication Proceedings, Nov. 1993.
Opposition of Patent No. DE10047614, Jun. 25, 2003.
Opposition to European Patent No. 1322458 B1, Jan. 19, 2005.
International Search Report, PCT/DE00/03324, (Published as WO2002/026419), dated Jun. 5, 2001.
International Search Report, PCT/DE01/03661, (Published as WO2002/026420), dated Feb. 28, 2002.
International Search Report, PCT/DE01/03662, (Published as WO2002/026478), dated Mar. 1, 2002.
Marcus, et al., Solid Freeform Fabrication Proceedings, Sep. 1995, p. 130-133.
International Search Report, Application No. PCT/DE2008/0017073 dated Nov. 6, 2009.
Office Action from the European Patent Office, Application No. 08784270.4 dated Jul. 6, 2011.
Office Action from the European Patent Office, Application No. 08784270.4 dated Sep. 5, 2013.
Gebhart, Rapid Prototyping, pp. 118-119, 1996.
Armin Scharf, "Erster 3D-Endlosdrucker", zwomp.de, http://www.zwomp.de/2012/11/06/voxeljet-endlosdrucker/ dated Nov. 6, 2012.
Voxeljet's VXconcept—Continuous 3D printing for sand casting, You-Tube, Nov. 16, 2011, XP002713379, retrieved from the Internet URL: http://www.youtube.com/watch?v=hgIrNXZjIxU retrieved on Sep. 23, 2013.
Screen shots of URL: http://www.youtube.com/watch?v=hgIrNXZjIxU taken in approximately 5 second intervals on Nov. 12, 2015.
European Office Action, EP Application No. 08784270.4 dated Sep. 5, 2013.

\* cited by examiner

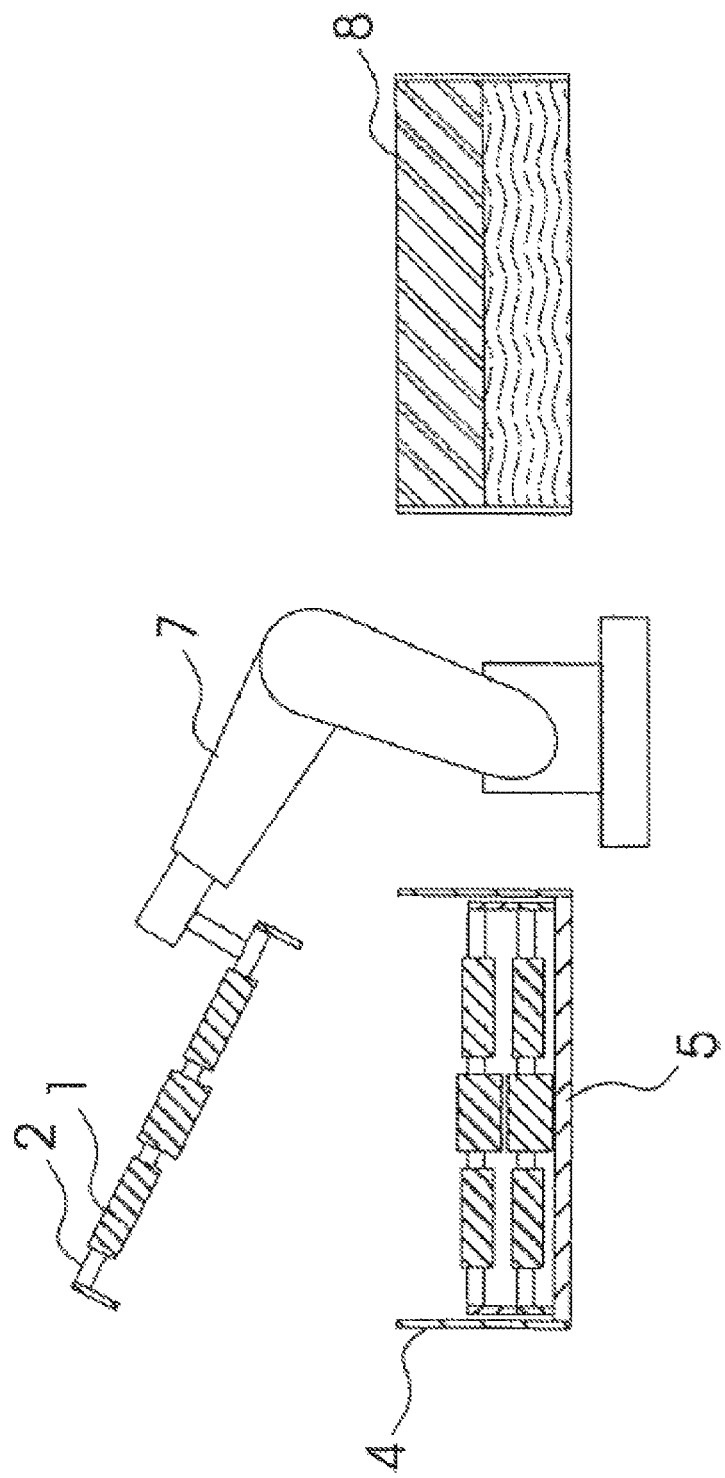

ARTICLES AND STRUCTURES PREPARED BY THREE-DIMENSIONAL PRINTING METHOD

CLAIM OF PRIORITY

The present invention is a divisional patent application of U.S. patent application Ser. No. 12/669,063 having a 371(c) date of May 16, 2011, which claims priority from German Patent Application No. DE 102007033434, filed on Jul. 18, 2007 and is the National Phase of PCT Patent Application PCT/DE2008/001073, filed on Jul. 1, 2008. The disclosure of U.S. patent application Ser. No. 12/669,063, German Patent Application DE 102007033434, and PCT Patent Application PCT/DE2008/001073 are each incorporated herein by reference in its entirety.

FIELD

The present invention relates to a method for producing three-dimensional components, using a three-dimensional printing method.

BACKGROUND

Methods for producing three-dimensional components have been known for some time.

For example, a method for producing three-dimensional objects from computer data is described in the European patent specification EP 0 431 924 B1. In this method, a particulate material is deposited in a thin layer onto a platform, and a binder material is selectively printed on the particulate material, using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is achieved. A three-dimensional object is thereby produced from the printed and solidified areas.

After it is completed, this object produced from solidified particulate material is embedded in loose particulate material and is subsequently removed therefrom. This is done, for example, using an extractor. This leaves the desired objects, from which the remaining power is removed, for example by brushing.

Other powder-supported rapid prototyping processes work in a similar manner, for example selective laser sintering or electron beam sintering, in which a loose particulate material is also deposited in layers and selectively solidified with the aid of a controlled physical radiation source.

All these methods are referred to collectively below as "three-dimensional printing method" or "3D printing method".

In all of these three-dimensional printing methods, the loose, unsolidified particulate material supports the structural body during and after construction of the structural body. However, additional support structures, which are necessary, for example, in a different layering method (the so-called stereolithographic method), are usually not required in the 3D printing method.

This characteristic has so far been regarded as a great advantage of the 3D printing method, since manual post-processing of the components is not required in order to remove any support structures.

However, if a method such as powder-supported rapid prototyping is used in order to produce a larger number of objects, a variety of problems may potentially arise.

After they are completed, the parts are entirely covered by loose particulate material and are therefore initially not visible to the operator. If the operator uses an extractor to remove the loose particulate material, the produced objects are in danger of being damaged by the suction nozzle. In the case of small parts, in particular, the parts are also in danger of being unintentionally drawn into the suction nozzle.

Large, filigree structures may also be damaged after production when they are removed from the powder bed, if parts of the object are still located in the powder bed and are somewhat more difficult to remove.

It is also possible for components to become dislodged and slip or collapse under their own weight if the loose particulate material beneath the component is carelessly removed.

For all of these reasons, it has not yet been possible to automate the removal of the components from the powder bed.

SUMMARY

An object of the present invention is therefore to provide a method and a device which make it possible to easily and safely remove any 3D-printed object from the loose particulate material.

According to the invention, this object is achieved by a method for producing three-dimensional components using a three-dimensional printing method, an auxiliary structure additionally being formed beyond the extension of the one or more components during the construction of components.

The object is also achieved by an auxiliary structure according to the invention for components produced by means of three-dimensional printing methods, the auxiliary structure being constructed along with the component and extending beyond a dimension of the one or more components.

By additionally constructing an auxiliary structure of this type, it is a great deal easier to handle potentially small and filigree-structured components.

According to a preferred embodiment of the method according to the invention, the auxiliary structure is additionally constructed in such a way that two simultaneously constructed components are interconnected directly or indirectly by the auxiliary structure.

In such an embodiment of the present invention, it potentially become even easier to handle the produced components, since multiple components may be removed at the same time. This may be advantageous, in particular, if the components are relatively small.

In a method according to the invention, the auxiliary structure may advantageously include materials of the component.

Such an embodiment of the method according to the invention makes it easy to construct the auxiliary structure and also requires only a reasonable amount of additional time to construct the auxiliary structure.

According to a particularly preferred embodiment of the present method, the auxiliary structure is largely formed from the same material as the one or more components. This potentially makes it particularly easy to additionally build the auxiliary structure.

According to a particularly preferred embodiment of the method according to the invention, multiple layers of components are formed on top of each other. This means that, during a single build process, multiple components may be formed not only next to each other, but also on top of each other. In the event that particularly small or even only particularly flat components are to be constructed, this is a possible embodiment of the method.

The auxiliary structure may have any conceivable shape. However, it may be advantageous if, in the event that multiple components are produced on top of each other, a separate auxiliary structure containing all components on a layer is formed on each layer of components.

In the method, as described according to the invention, it is possible according to an embodiment of the present invention to form the component and the auxiliary structure with the aid of particulate materials deposited in layers and by adding a further material or by selectively applying energy.

According to the method, the auxiliary structure is preferably formed in such a way that it is connected to at least one component. It is therefore also conceivable that in some embodiments it is advantageous to interconnect all components of a manufacturing process.

It may also be advantageous to form predetermined break points at junctions between the component and auxiliary structure in the method according to the invention.

According to an embodiment of the invention, it has also proven to be helpful if the auxiliary structure further forms a holder or coupling device, since this makes it particularly easy to handle the formed components. A holding device of this type may be a holder for a handling tool.

A further improvement achievable by an auxiliary structure according to the present invention is that the auxiliary structure may enable the handling of components to be automated.

To make the components particularly easy to handle, the auxiliary structure, according to one embodiment, connects at least two component on a component layer.

It may also prove to be particularly advantageous if the auxiliary structure interconnects all constructed components. This makes it particularly easy to remove the components after they have been completed, and this may be done in a single operation.

According to an embodiment of the invention, it may be useful to always orient the auxiliary structure on one side of the build cylinder in order to have a uniform starting point for any removal devices and then to group the desired components on this side, which saves space. Due to known build time considerations, it would then be possible for the rest of the auxiliary structure to follow the contours of the components as closely as possible.

It would be possible to connect the auxiliary structure directly to the one or more components.

A further possibility would be to connect the auxiliary structure indirectly to the one or more components, for the auxiliary structure does not necessary have to be integrally connected to the component. Embodiments are also conceivable in which the auxiliary structure holds the component in a positive fit or is even positioned a short distance away from the component, permitting slight movements of the component.

It may also be possible to design the auxiliary structure as a kind of lattice box surrounding the component, which has only thin strips for separating the space segments.

According to a particularly preferred embodiment of the present invention, the determination of the suitable auxiliary structure should be automated as much as possible in process-preparing software.

For example, a possible workflow would be to place the parts to be built in the virtual build space, using a computing program. In a subsequent step, the operator marks the positions on the components for connecting the auxiliary structure. The process software subsequently computes the optimized auxiliary structure and also dimensions it on the basis of the available data relating to component volume and therefore weight.

Next, the entire build space, including the auxiliary structure, is divided into the desired layers, and this data is then transferred to the layering process, which enables the component and the auxiliary structure to be constructed by means of the desired 3D printing method.

The auxiliary structure may also be used to facilitate component identification, for example by applying component numbers or component codes to the strips for the corresponding components. These codes may be provided, for example, in machine-readable form so that they may be supplied to an automated evaluation system.

According to a further embodiment of the invention, a method for producing three-dimensional components from a particulate base material is provided. The base material is deposited in layers and subsequently connected selectively along a contour of the component predetermined by a controller by adding a further material or applying energy. The component is completed by repeating this operation multiple times. In the present case, an auxiliary structure is preferably constructed along with the component, and this auxiliary structure holds the one or more components to be constructed in the desired position within the build space even without the supporting effect of the surrounding powder material.

If, according to a particularly preferred embodiment of the present invention, the auxiliary structure has a different color than the component, it may be, for one thing, particularly easy to handle the components, since it is very easy even for a machine to determine what the auxiliary structure represents and where it should be possible to grip the formed structure.

For the purpose of more detailed explanation, the invention is described in further detail below on the basis of preferred embodiments with reference to the drawing.

BRIEF DESCRIPTION OF THE DRAWINGS

FIG. 4 shows an automated means of removing components provided with auxiliary structures.

DETAILED DESCRIPTION

Figure 1:
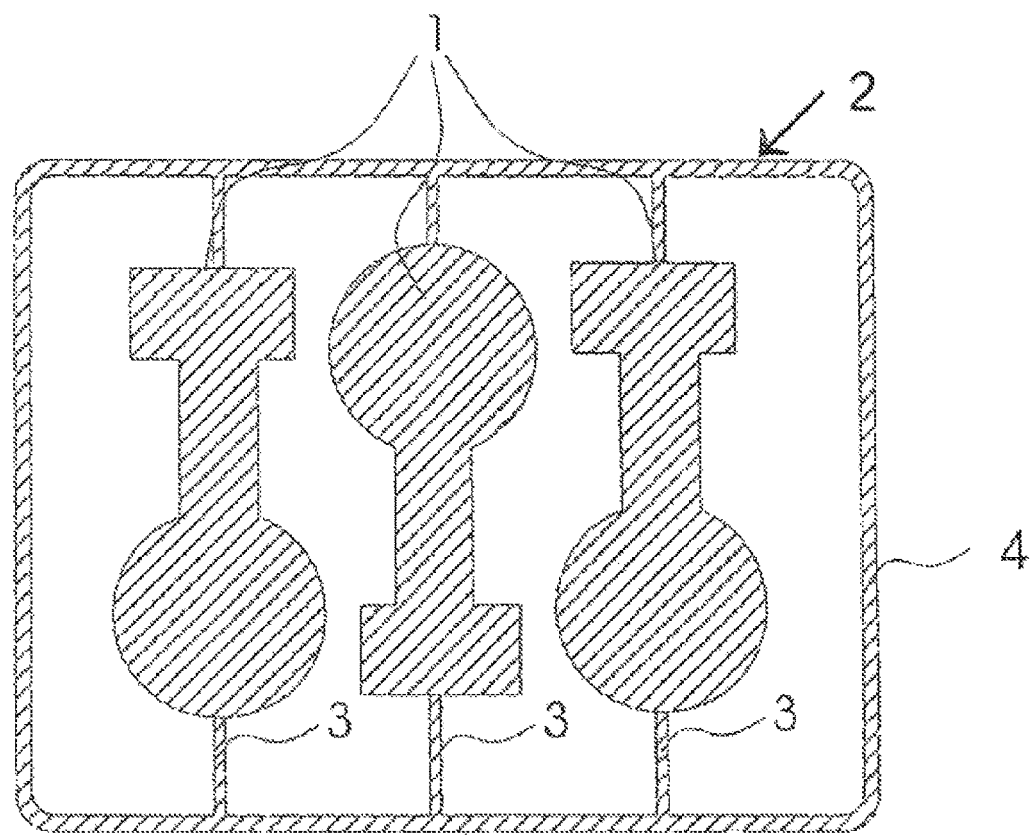
FIG. 1 shows an auxiliary structure designed as a frame according to a first preferred embodiment of the present invention.

FIG. 1 shows a top view of a connection of multiple components 1 having an auxiliary structure 2, auxiliary structure 2 including a frame 4 surrounding components 1. Components 1 are connected to frame 4 by strips 3.

According to the embodiment of the invention illustrated in FIG. 1, auxiliary structure 2 includes frame 4, which surrounds components 1 on a plane and is connected to the individual components by strips 3. Frame 4 is dimensioned in such a way that all components 1 connected thereto are held on this frame 4 by the force of their own weight without damaging the frame.

To limit the amount of powder consumed, it is possible to provide at least part of auxiliary structure 2 with a non-solid design. For example, it would be possible to produce at least part of frame 4 from hollow or open profiles whose interiors may be accessible to cleaning agents via corresponding openings.

For example, frame 4 may have a rectangular cross section; however other cross sections, such as round or oval ones, are also conceivable without further limitation.

To shorten the build time for auxiliary structure 2, it may be advantageous, according to a preferred embodiment of the invention, to position auxiliary structure 2 as closely as possible to components 1 and thereby give it a minimal dimension.

Figure 2:
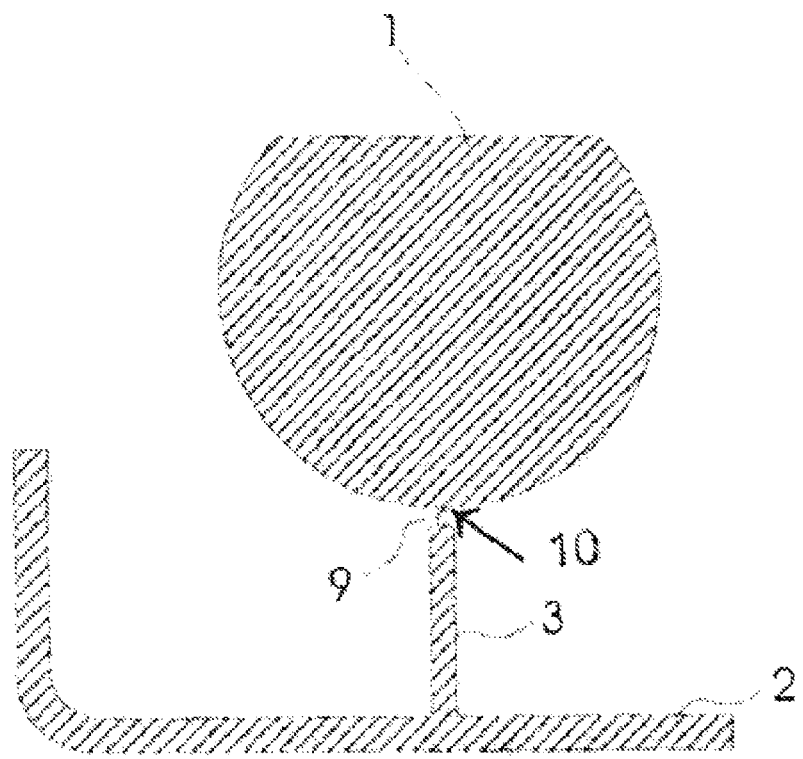
FIG. 2 shows a possible shape of an auxiliary structure for connection to the components, according to a further embodiment of the present invention.

FIG. 2 shows a possible means of connecting an auxiliary structure 2 to a component 1 according to a further embodiment of the present invention.

To limit post-processing work for removing strips 3 or the contact points of strips 3 on component 1, it may be advantageous to provide auxiliary structure 2 with a minimal number of connecting points 10 to components 1.

Strips 3, along with their connecting points 10, may be designed with so-called predetermined break points 9 to facilitate removal, these predetermined break points being provided with a geometrically defined constriction 9, as illustrated by way of example in FIG. 2.

Alternatively or in addition, it would also be possible to produce predetermined break point 9 by reducing the solidity, for example by reducing the binder deposit.

Connecting points 10 are also preferably located at points on components 1 which do not require an exact surface. It is thus undesirable for a poorly placed connecting point to mar the visual appearance.

Preferred locations for connecting points 10 may be, for example, on the rear or inside surfaces of component 1. However, when selecting connecting points 10, it is also important to ensure that accessibility is maintained and that the connections may be removed without residue. For this reason, outwardly curved surfaces are potentially more suitable, since they are more easily accessible than inwardly curved surfaces.

The number of connecting points 10 should preferably also be selected in such a way that they are sufficient to hold connected component 1 in any position by the force of its own weight and, if possible, also under the influence of weaker or stronger additional forces following post-processing work.

Figure 3:
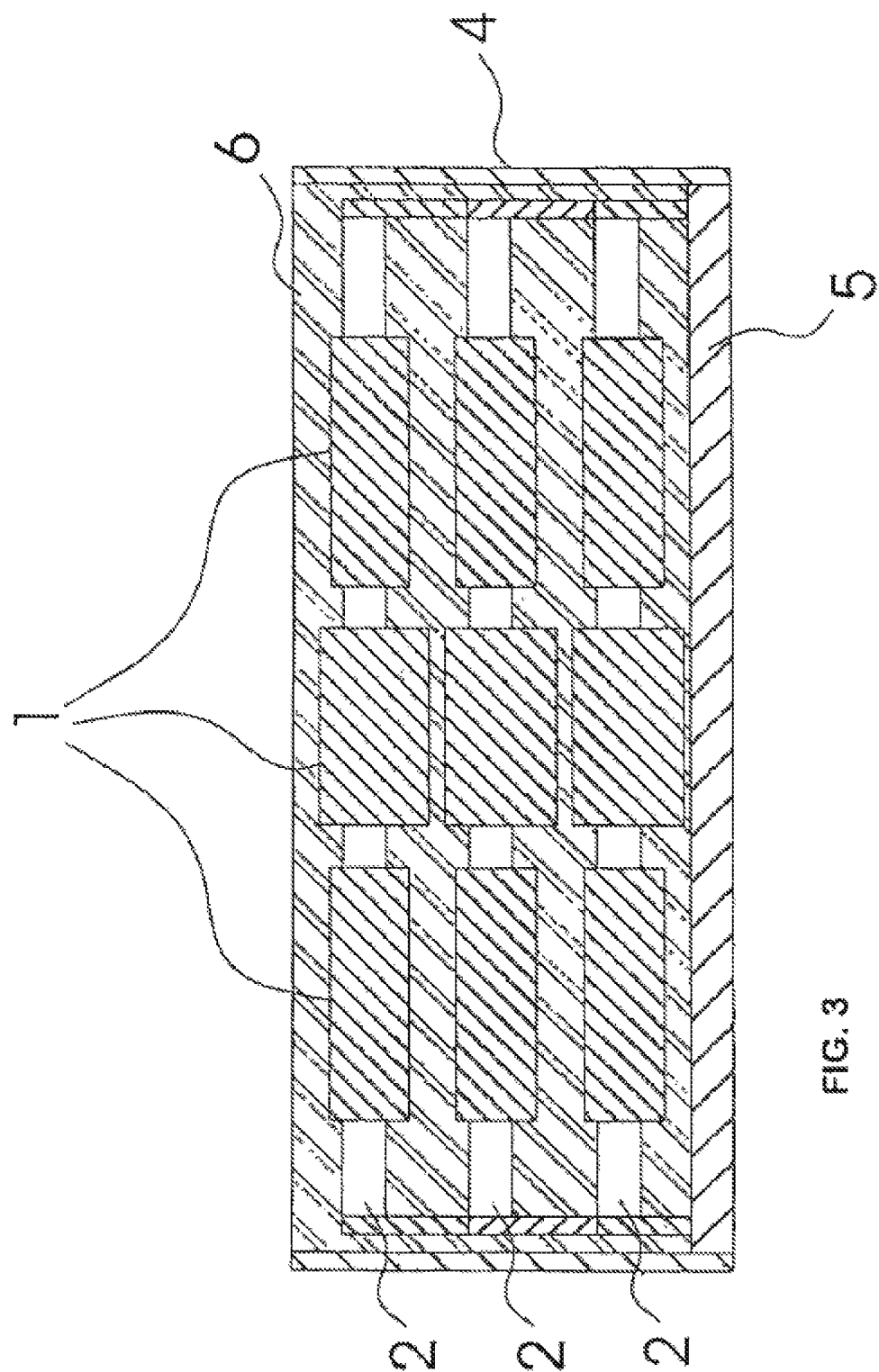
FIG. 3 shows a system of multiple components in a build cylinder according to a third preferred embodiment of the method according to the invention.

FIG. 3 shows a system of multiple components 1 in a build cylinder 4 after components 1 have been constructed, according to a further preferred embodiment of the method according to the invention.

In 3D printing as well as in other RP methods, it is possible to produce components in multiple layers on top of each other, depending on the component size and component shape. Access to the individual layers is usually only from one side, ordinarily from the side on which the particulate material is introduced.

In order to reach the underlying components, the top components must first be removed.

As shown in FIG. 3, it may therefore be advantageous to divide components 1 and associated auxiliary structures 2 into different planes which, if necessary, run parallel to the layering plane. This enables the individual "component planes" to be removed easily and successively.

Auxiliary structures 2 of the individual planes should preferably be easily separated from each other and nevertheless be fixable in place without supporting powder material.

Depending on the component size and component weight, it would also be conceivable to interconnect the components on different component planes via the auxiliary structure.

It may also be advantageous if the auxiliary structure interconnects the component additionally or exclusively in a direction perpendicular to the layering direction, instead of in a direction parallel to the layering direction.

Connecting the components to an auxiliary structure makes it possible to use automated removal and cleaning methods. This is currently made difficult by the fact that the components are usually designed individually and have no holding means, for example for robot grippers. The use of simple gripping mechanisms would quickly cause damage to the components.

FIG. 4 shows an automated means of removing components 1 provided with auxiliary structures 2, which is made possible through the use of the auxiliary structures.

By using auxiliary structure 2, it is possible, according to an embodiment of the present invention, to define a uniform holding means for automatic removal or cleaning or post-processing.

A robot 7 would be able to successively remove an auxiliary structure 2 provided with a frame and including components 1 and to supply them to a post-processing process such as cleaning.

Loose particle material 6 may also be more easily removed, for example by removing at least a portion of base 5 of the vessel where the layering process took place, or if the base has closable openings which are opened at the end of the process, and if the loose particulate material, which has a sufficient fluidity, flows out through the base openings.

According to this technique, components 1 are held in the predetermined position by auxiliary structure 2 and are not carried along by outflowing particulate material 6.

However, it would also be possible to remove loose particulate material 6 via the upper opening in the build container, for example by tilting the entire build container in order to pour out loose particulate material 6. If auxiliary structure 2 is held in place on the build cylinder, for example by clamps, components 1, including auxiliary structure 2, remain in the predefined position is not impaired by this operation and are therefore also not damaged.

It would also be possible to extract loose particulate material 6, as is known from the prior art. A suction lance may be positioned over the powder feedstock from above, or the suction lance is inserted directly into the powder feedstock, and the loose particulate material then flows to the suction nozzle. In both cases, components 1 remain in a desired position due to auxiliary structure 2, and they are therefore not unintentionally extracted or damaged.

After a large part of loose particulate material 6 has been removed, components 1, including auxiliary structure 2, may be removed from the build container and supplied to a further cleaning process. This may be done using compressed air or compressed air combined with blasting media. In this case, auxiliary structure 2 again enables components 1 to remain in a desired position and the cleaning agents to be passed over components 1. This operation may be carried out manually or automatically. For example, it would be conceivable to use an automatic cleaning system into which multiple standardized auxiliary structure frames 4, including components 1, are introduced, and by means of which components 1 may be cleaned of remaining residual particulate material 6 in a closed process chamber, using a fluid medium such as compressed air.

Particulate material 6 separated from component 1 may then be supplied to a separator via a process chamber extraction system and fed back into the build process.

The strong flow rates needed in an automatic cleaning system of this type require components 1 to be sufficiently fixed in place, which may be accomplished with the aid of auxiliary structure 2.

After cleaning, components 1 may have to be infiltrated in order to achieve certain material properties. This may be accomplished by immersing the components into a tank filled with fluid infiltration medium 8.

This operation may be greatly facilitated by auxiliary structure 2, since multiple components 1 may be easily held at once and thus also safely immersed at once. In this case, it is also possible to easily automate the operation by introducing one or more frames, for example into a lattice box, and then immersing them together with the lattice box into infiltration tank 8, as shown, for example, in FIG. 4. Of course, it is also conceivable to automate the immersion of individual "component layers".

Finally, components 1 must be separated from auxiliary structure 2.

It is helpful to distinguish the auxiliary structure from the component with the aid of colors, which may be accomplished, for example, by applying additional dye during the 3D printing process or by means of a modified chemical reaction via overhardening or underhardening. A distinction may also conceivably be made by means of a particular surface structure which is used only in the auxiliary structure.

What is claimed is:

1. An article comprising an auxiliary structure; and one or more components produced by means of a three-dimensional printing method, whereby the auxiliary structure is constructed along with the one or more component and extending beyond a dimension of the one or more components; wherein the auxiliary structure is connected directly to the one or more components; and
the auxiliary structure and the one or more components are formed from a same powder material and a same binder material.

2. The article of claim 1, wherein the auxiliary structure forms a holder or a coupling device for handling the component(s) after removing the auxiliary structure and the component(s) from loose powder.

3. The article of claim 1, wherein the auxiliary structure enables an automated handling of the components after removing the auxiliary structure and the component(s) from a loose powder.

4. The article of claim 1, wherein the auxiliary structure connects at least two components of a component layer.

5. The article of claim 1, wherein all constructed components are connected to the auxiliary structure.

6. The article of claim 1, wherein the one or more components includes a first component and a second component and the auxiliary structure is connected directly to the first and second components.

7. The article of claim 1, wherein the auxiliary structure largely surrounds one or more of the components.

8. The article of claim 1, wherein the auxiliary structure has a different color than the one or more components.

9. An article comprising:
an auxiliary structure connecting to one or more components, wherein the one or more components and the auxiliary structure are produced by means of a three-dimensional printing method, wherein the auxiliary structure extends beyond a dimension of the one or more components;
the auxiliary structure is connected indirectly to the one or more components;
the auxiliary structure and the one or more components include a same particulate material deposited in layers and connected selectively by a further material or by applying energy; and
the one or more components have a structure capable of being infiltrated by a fluid infiltration medium.

10. An article comprising:
an auxiliary structure connected directly by two or more components;
the auxiliary structure and the two or more components produced by means of a three-dimensional printing method, whereby the auxiliary structure is constructed along with the two or more component and extending beyond a dimension of the two or more components;
wherein the auxiliary structure and the components are formed from a same powder material and a same binder material.

11. The article of claim 10, wherein the article includes multiple layers of components.

12. The article of claim 11, wherein the article includes a separate auxiliary structure on each layer of components.

13. The article of claim 10, wherein the article includes a predetermined break points formed at junctions between each of the components and the auxiliary structure.

14. The article of claim 10, wherein the article includes loose powder material between two of the two or more components.

15. The article of claim 11, wherein the article includes loose powder material between adjacent layers of components.

16. The article of claim 14, wherein the auxiliary structure and the components are formed from the same powder material and the same binder material, and wherein the powder material of the auxiliary structure is the same as the powder material of the loose powder material.

17. An article comprising:
an auxiliary structure connected directly by two or more components;
the auxiliary structure and the two or more components produced by means of a three-dimensional printing method, whereby the auxiliary structure is constructed along with the two or more components and extending beyond a dimension of the two or more components;
wherein the two or more components includes a first component and a second component, the auxiliary structure and the first and second components include a same particulate material deposited in layers and connected selectively by a further material or by applying energy; and the first and second components have a structure capable of being infiltrated by a fluid infiltration medium.

18. The article of claim 17, wherein the auxiliary structure is connected to the first component at a first predetermined break point and is connected to the second component at a second predetermined break point.

19. The article of claim 18, wherein the auxiliary structure allows for automatic handling of components that are too small to be handled automatically.

20. An article comprising:
- an auxiliary structure;
- a first component connected directly to the auxiliary structure; and
- a second component; connected directly to the auxiliary structure;
- wherein the auxiliary structure and the two or more components are produced by means of three-dimensional printing methods including a same particulate material deposited in layers and connected selectively by a further material or by applying energy;
- wherein the auxiliary structure extends beyond a dimension of the first component;
- and the first and second components have a structure capable of being infiltrated by a fluid infiltration medium.

21. The article of claim 20, wherein the auxiliary structure is connected to the first component at a first predetermined break point and is connected to the second component at a second predetermined break point.

22. The article of claim 20, wherein the first component is identical to the second component.

23. The article of claim 20, wherein a horizontal plane passes through the first component, the second component, and the auxiliary structure.

* * * * *